United States Patent [19]

Gyarmathy et al.

[11] 4,100,745
[45] Jul. 18, 1978

[54] THERMAL POWER PLANT WITH COMPRESSED AIR STORAGE

[75] Inventors: Georg Gyarmathy, Zollikon; Hans Pfenninger, Baden, both of Switzerland

[73] Assignee: BBC Brown Boveri & Company Limited, Baden, Switzerland

[21] Appl. No.: 763,336

[22] Filed: Jan. 28, 1977

[30] Foreign Application Priority Data

Mar. 15, 1976 [CH] Switzerland ............ 3165/76

[51] Int. Cl.² ............ F02C 1/04; F02C 7/00
[52] U.S. Cl. ............ 60/652; 60/655; 60/659
[58] Field of Search ............ 60/398, 413, 652, 650, 60/682, 655, 659

[56] References Cited

U.S. PATENT DOCUMENTS

| 2,942,411 | 6/1960 | Hutchings | 60/641 |
| 3,677,008 | 7/1972 | Koutz | 60/650 |
| 3,895,493 | 7/1975 | Rigollot | 60/398 X |
| 3,988,897 | 11/1976 | Strub | 60/652 X |
| 3,996,741 | 12/1976 | Herberg | 60/413 X |

*Primary Examiner*—Allen M. Ostrager
*Attorney, Agent, or Firm*—Burns, Doane, Swecker & Mathis

[57] ABSTRACT

A thermal power plant of the type in which excess energy produced by the plant during off-peak load periods is used to produce compressed air which is then accumulated in a storage tank. The compressed air is withdrawn from storage during peak load periods and delivered to a hot air turbine for generation of additional energy. A heat exchanger is incorporated in he compressed air line leading from the storage tank to the hot air turbine and steam is supplied to the heat exchanger for heating the compressed air prior to delivery to the hot air turbine. Heating steam can be produced by electrically heating water in a storage tank or it can be constituted by bleeder steam taken from an auxiliary steam turbine facility, or it can be taken from a steam storage tank.

13 Claims, 3 Drawing Figures

THERMAL POWER PLANT WITH COMPRESSED AIR STORAGE

BACKGROUND OF THE INVENTION

This invention is directed to an improvement in a thermal power plant which produces, during periods of low loads by use of its excess energy, compressed air which is accumulated in a storage tank and withdrawn again at the time of peak loads for the generation of additional energy, where the compressed air, after heating, drives a hot-air turbine, acting as power gas.

Recently, compressed-air storage has been proposed as a support for peak loads in connection with thermal power plants. Nuclear power plants, for example, cannot be shut down overnight, and excess energy is therefore available during the period of low loads, to be stored in a suitable manner and subsequently utilized as a support for peak loads. In areas where water is available and sufficient differences in height exist, hydraulic pumped storage systems can, and have been constructed for a long time. In flat areas such systems can be constructed only at great costs, provided this is feasible at all geologically. In such cases a compressed-air storage will be the proper solution. It is known for example — see Brown Boveri Mitteilungen 62, (1975) pages 332 to 337 — to compress air during the periods of low loads and to store this air in an underground cave. In order to cover the day-time peak load, the compressed air is fed into the combustion chamber of a gas turbine plant and the energy stored in this manner is converted into electric energy. Plants of this type require high-quality fuels and the costs for such special fuels are considerable. In Europe these costs are at least equal to the amount of all other costs for the operation of the power plant.

There is also known a power plant arrangement where the heat of compression contained in the compressed air is transferred to an underground heat storage facility prior to its flow into the compressed-air storage. Any air that is withdrawn later on from the storage, will flow again through the heat storage where it is heated up and then fed into a hot-air turbine. This specific system has the disadvantage that it will not be possible to provide any inter-cooling in the compressor because the heat is needed for the operation of the turbine. As a result thereof, the drive of the compressor will consume a great amount of energy. Furthermore, the construction of an underground heat storage facility leads to various difficulties and problems.

SUMMARY OF THE INVENTION

It is the principal object of the invention to reduce, in the case of a power plant of the above-described type, the ratio of the power to be expended by the compressor and the power produced by the hot-air turbine.

The invention solves this problem by using water vapor for the heating of the compressed air.

Steam acting as a heating medium has the advantage that the temperature of the compressed air can be raised as desired, subject to technological limitations, resulting in a great increase in turbine output. Furthermore, an inter-cooling of the air during its compression and an after-cooling becomes feasible, thus reducing the compressor power required. When steam is stored, the unit can be made much smaller in view of the efficient heat transfer than known underground heat storage arrangement.

BRIEF DESCRIPTION OF THE DRAWINGS

Practical examples of the invention are shown by the drawings in diagrammatic form and are explained below in detail. Items not needed for an understanding of the invention have been omitted. In all figures identical components are denoted by identical reference numerals.

DETAILED DESCRIPTION OF PREFERRED EMBODIMENTS

Figure 1:
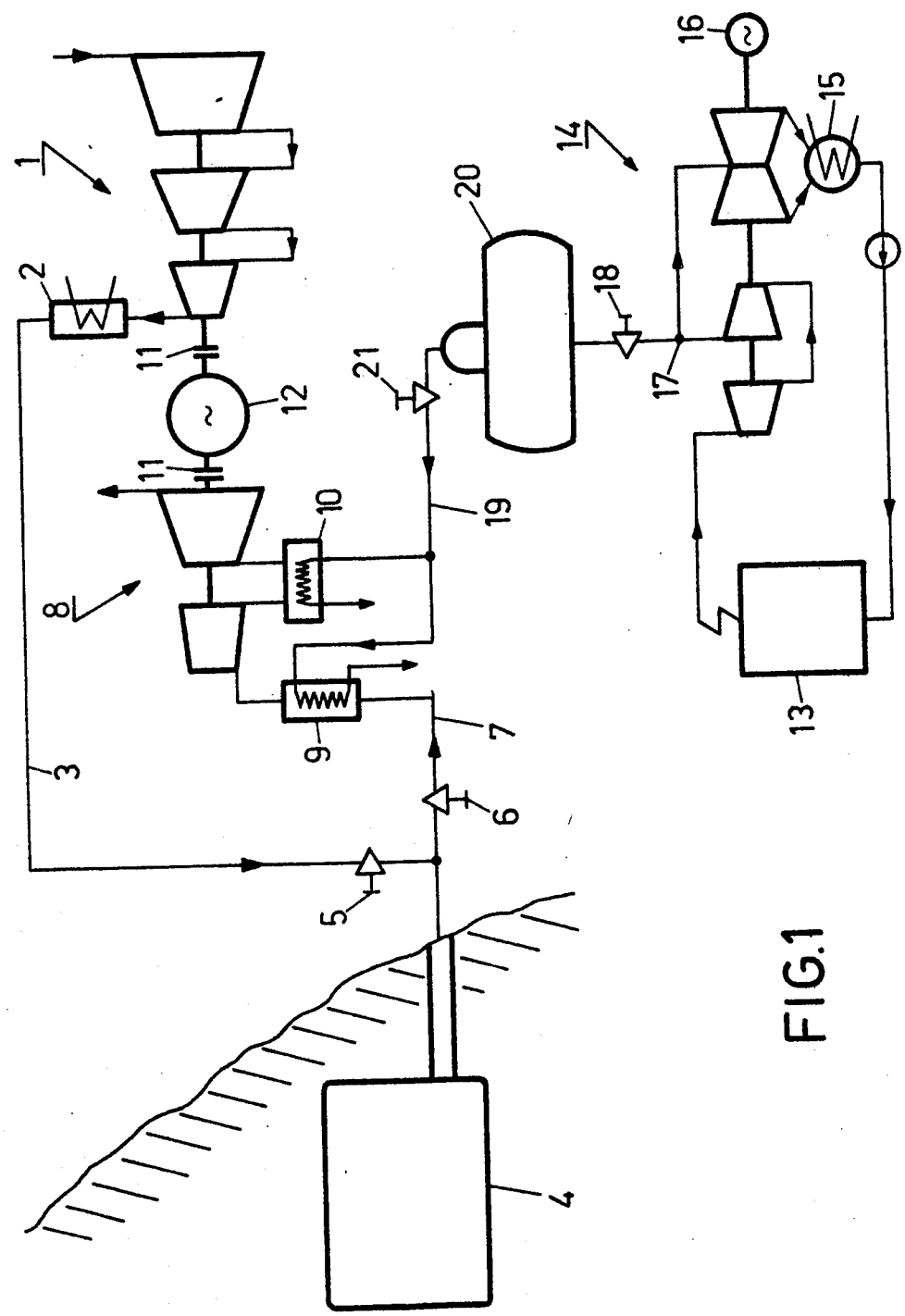
FIG. 1 shows an embodiment in which heating of the compressed air is effected by water vapor tapped from a steam turbine.

With reference now to FIG. 1, a multi-stage compressor 1 draws in ambient air and compresses it up to, for example, 60 bar. This air is then cooled down to approximately 30° C in an aftercooler 2 before it flows into a tank 4 by way of the pressure pipe line 3. A shut-off valve 5 included in the line 3 is open during this period.

When the energy stored in the compressed air is to be converted into electric energy, valve 5 is closed and a shut-off valve 6, located within a line 7 leading to a multi-stage hot-air turbine 8, is opened. In a heat exchanger 9, connected in series with line 7, the air is heated prior to its entry into the turbine 8, serving there as the power gas. An additional heat exchanger 10 for the air can be arranged after the high-pressure section 8a of the hot-air turbine 8, in which the partially expanded compressed air is superheated prior to its expansion to atmospheric pressure in the low-pressure section 8b of the turbine 8.

The power unit 12, which is a dynamo-electric machine, is connected either with the hot-air turbine 8 or with the compressor 1 by way of two disconnectible couplings 11, 11'. During periods of low loads, i.e., primarily during the night, coupling 11 to the turbine 8 is disengaged and the coupling to the compressor 1 is engaged. The power unit 12 is then operated as a motor and drives the compressor which delivers compressed air to the tank 4. During periods of peak loads, coupling 11 to the turbine 8 is engaged and the coupling 11' with the compressor 1 is disengaged; the power unit 12 then operates as a generator and delivers electric energy to the mains.

The two heat exchangers 9 and 10 are steam-heated. The steam required for this purpose is withdrawn from a steam turbine plant which comprises primarily a steam generator 13, a multistage steam turbine 14, a condenser 15 and an electric generator 16, driven by the steam turbine. During periods of peak loads, bleeder steam is withdrawn at point 17 and conducted to the heat exchangers 9 and 10 by way of line 19 with a valve 18 in the line being open. During the night, i.e., during off-peak periods, this valve 18 is closed and generator 16 of the steam turbine plant delivers its energy partially or in toto to the power unit 12.

This arrangement has the advantage that it is economical in components and therefore inexpensive. It has the disadvantage however that steam is being withdrawn from the steam turbine plant, thereby lowering its generator output, during the time of peak loads, i.e., at a time of maximum power requirements.

In order to avoid this reduction in output of the steam turbine plant, it is possible to insert into the bleeder line 19 a steam storage tank 20 and, viewed in the direction of flow, following the tank a valve 21. It is also possible to use in place of the steam storage tank a hot-water storage tank, for example, a "Ruth" tank. During periods of low loads, the steam turbine plant will then not only drive the compressor 1 electrically by way of the power unit 12 but in addition thereto, the steam turbine will also charge the storage tank 20. During periods of peak loads, the steam for the heat exchangers 9 and 10 will then be furnished by the storage tank 20. In this manner there will be available during periods of peak loads not only the full power of the hot-air turbine 8 but also the full power of the steam turbine.

The power plant described above can be modified in that manner that the power unit 12 will have no connection with the compressor. It will then serve solely as a generator for the hot-air turbine 8 and the compressor 1 is driven, for example, directly by the steam turbine 14, obviously, means must be provided in this case to separate these two units.

Figure 2:
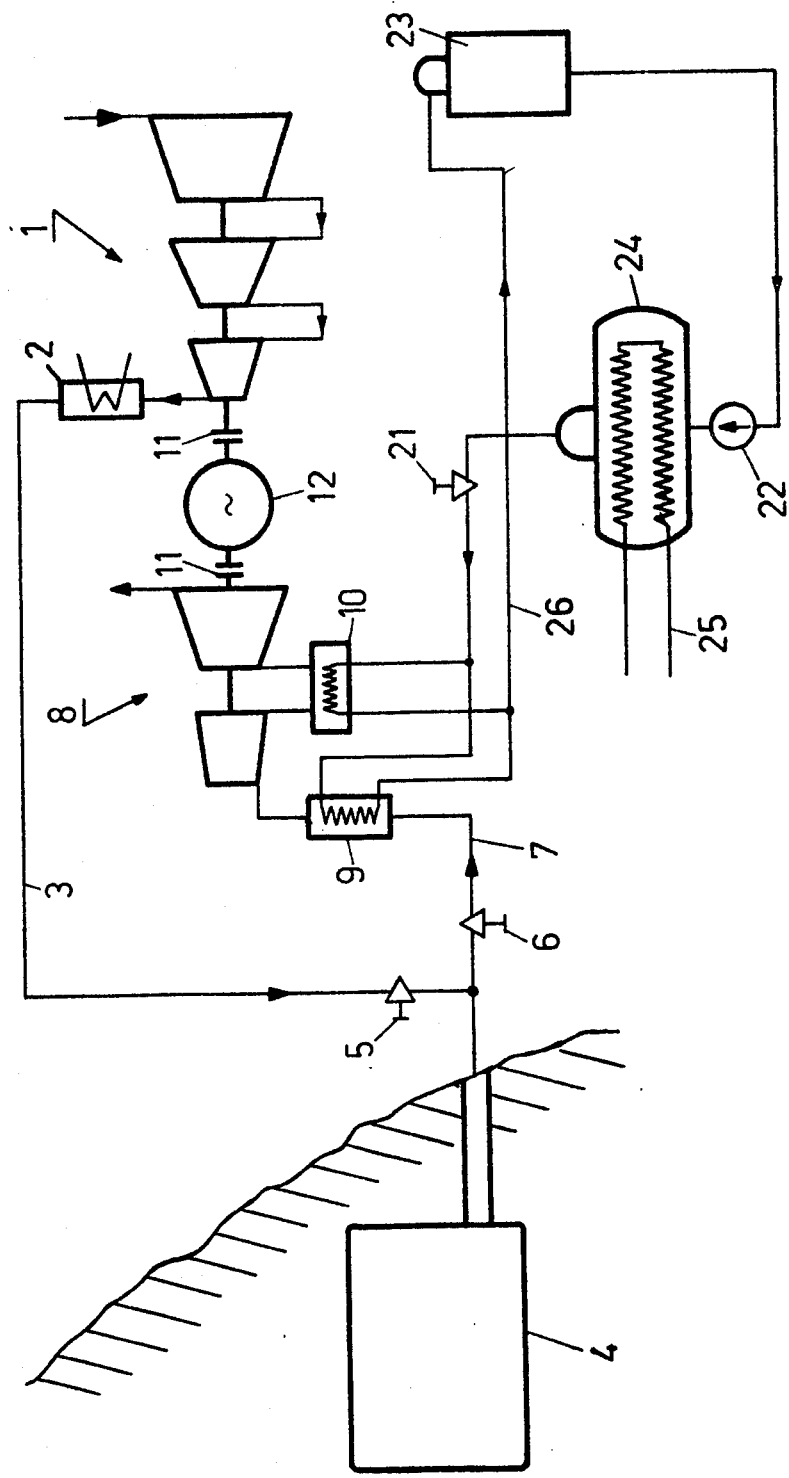
FIG. 2 shows an embodiment in which heating of the compressed air is effected by water vapor produced by means of electric energy.
Figure 3:
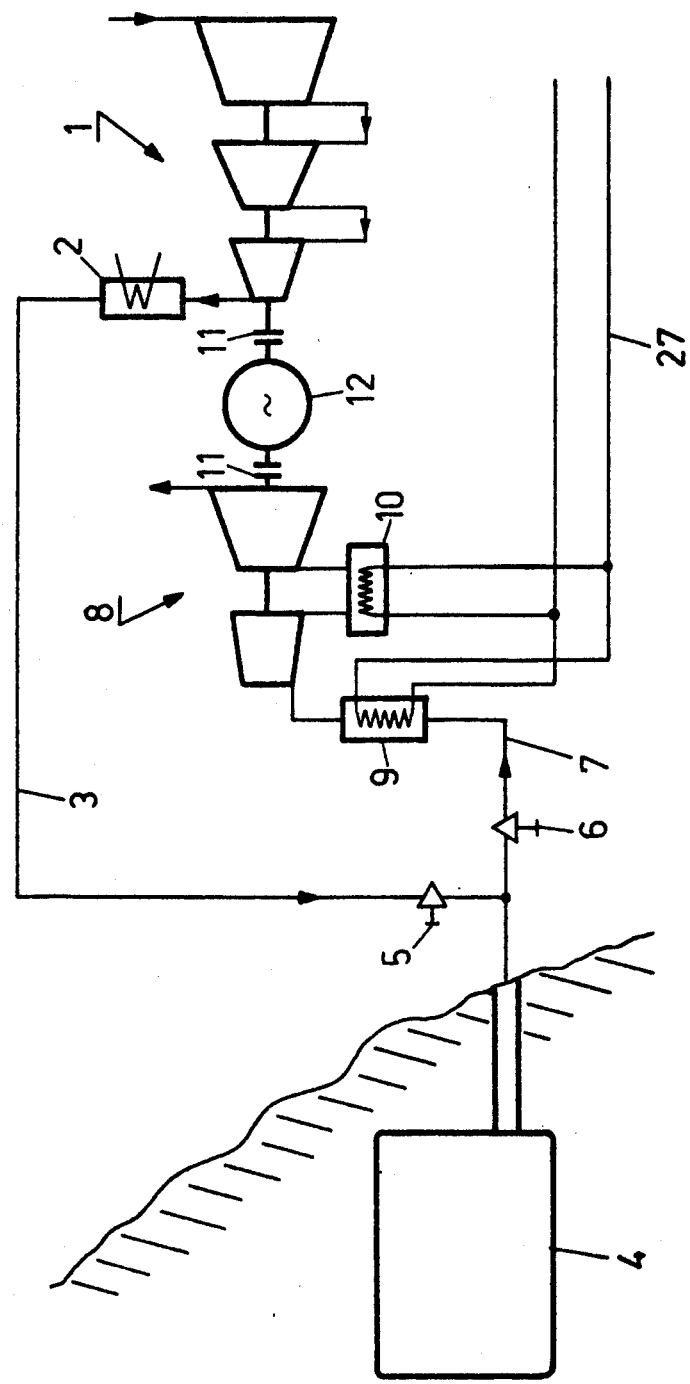

An alternative solution for the generation of steam for the purpose of heating the compressed air is shown by FIG. 2. A circulation pump 22 delivers water from a tank 23 to a hot-water storage tank 24 where the water is vaporized by an electric heater unit 25 and then conveyed to the heat exchangers 9 and 10. The condensed vapor will return to tank 23 by way of a return line 26.

The cold condensation product can also be fed directly into the lower portion of the hot-water storage tank 24 instead of a return to the tank 23. It should be mentioned in this connection that any heat given off by the various processes, for example, the inter-cooling of the compressor, can be utilized for the pre-heating of the water.

Obviously, instead of the hot-water storage tank a steam storage tank, for example, the tank shown by FIG. 1, can be heated during the night by use of electric energy. The night-energy of the basic power plant is utilized in this case not only for the compression of air but in addition thereto also for the charging of the steam storage tank.

We claim:

1. In a thermal power plant of the type which produces compressed air by use of excess energy generated during off-peak load periods and which is accumulated in a storage tank, the stored compressed air being withdrawn from said tank and delivered to a hot-air turbine through a compressed air line extending from said storage tank to said hot-air turbine during peak load periods for generation of additional energy, the improvement comprising:
   a heat exchanger included in said compressed air line;
   a steam turbine for producing bleeder steam; and,
   means for supplying said bleeder steam to said heat exchanger for heating said compressed air prior to delivery to said hot-air turbine.

2. A thermal power plant as defined in claim 1 wherein the bleeder steam supplied to said heat exchanger for heating said compressed air prior to delivery to said hot air turbine is accumulated in a steam storage tank.

3. A thermal power plant as defined in claim 1 wherein the bleeder steam supplied to said heat exchanger for heating said compressed air prior to delivery to said hot air turbine is accumulated in a hot-water storage tank.

4. A thermal power plant, comprising:
   compressor means for producing compressed air by use of excess energy generated during off-peak load periods;
   first storage means for accumlating said compressed air;
   hot-air turbine means for generating energy during peak load periods;
   a compressed air line extending from said storage means to said hot-air turbine means;
   steam generation means for producing steam during said off-peak load periods;
   second storage means for accumulating said steam produced by said steam generation means;
   heat exchanger means included in said compressed air line for heating said compressed air prior to delivery to said hot-air turbine means; and
   means for conducting said steam from said steam storage means to said heat exchange means.

5. The thermal power plant of claim 4 wherein the second storage means comprises a steam storage tank.

6. The thermal power plant of claim 4 wherein the second storage means comprises a hot water storage tank.

7. The thermal power plant of claim 4 wherein the steam generation means includes an electric heater.

8. The thermal power plant of claim 4 wherein the steam generation means includes a steam turbine which produces bleeder steam.

9. A method of generating energy from compressed gas during off-peak load periods by means of a hot-air turbine,
   comprising the steps of:
   compressing a quantity of air during said off-peak load periods;
   removing heat from said compressed air so as to cool said compressed air;
   accumulating said cooled, compressed air in a storage tank during said off-peak load periods;
   generating steam during said off-peak load periods;
   storing said steam in a storage tank;
   conducting said cooled compressed air from said storage tank to a hot air turbine through a heat exchanger during said peak load periods; and
   conducting steam from said storage tank to said heat exchanger to heat said compressed air during said peak load periods.

10. A method of generating energy during off-peak load periods from compressed air by means of a hot air turbine, comprising the steps of:
    compressing a quantity of air in a compressor during said off-peak load periods;
    removing heat from said compressed air so as to cool said compressed air;
    accumulating said cooled, compressed air in a storage tank during said off-peak load periods;
    conducting said cooled compressed air from said storage tank to said hot-air turbine through a heat exchanger during said peak load periods to generate energy in said hot-air turbine;
    generating bleeder steam in a steam turbine; and,
    conducting said bleeder steam to said heat exchanger to heat said compressed air during said peak load periods prior to delivery to said hot air turbine.

11. The method of claim 10 further comprising the step of:
    accumulating said bleeder steam in a storage tank.

12. The method of claim 10 further comprising the step of:
    accumulating said bleeder steam in a storage tank solely during said off-peak load periods.

13. The method of claim 11 further comprising the step of:
    driving said compressor by said steam turbine during said off-peak load periods.

* * * * *